United States Patent [19]

Pinsky

[11] 4,009,735

[45] Mar. 1, 1977

[54] THERMAL INSULATION

[75] Inventor: Gordon P. Pinsky, Columbus, Ohio

[73] Assignee: Owens-Corning Fiberglas Corporation, Toledo, Ohio

[22] Filed: Oct. 2, 1974

[21] Appl. No.: 511,392

Related U.S. Application Data

[63] Continuation of Ser. No. 409,109, Oct. 24, 1973, abandoned.

[52] U.S. Cl. .......................... 138/147; 24/DIG. 18; 138/149; 138/DIG. 2; 428/36; 428/101; 428/268
[51] Int. Cl.² ......................................... F16L 9/14
[58] Field of Search ............ 138/147, 149, DIG. 2, 138/DIG. 6; 24/DIG. 18; 161/DIG. 4, 79, 82, 93, 43; 29/132; 428/36, 101, 268

[56] References Cited

UNITED STATES PATENTS

| 2,264,967 | 12/1941 | Cryor | 161/79 X |
| 3,012,923 | 12/1961 | Slayter | 138/DIG. 2 |
| 3,062,242 | 11/1962 | Vanderbilt | 138/DIG. 2 |
| 3,276,928 | 10/1966 | Pearson et al. | 161/DIG. 4 |
| 3,372,438 | 3/1968 | Rinecker | 24/DIG. 18 |

Primary Examiner—Richard C. Queisser
Assistant Examiner—Charles Gorenstein
Attorney, Agent, or Firm—Patrick P. Pacella

[57] ABSTRACT

Thermal insulation for vessels and piping within the reactor containment area of nuclear power plants is disclosed. The thermal insulation of this invention can be readily removed and replaced from the vessels and piping for inservice inspection, can withstand repeated wettings and dryings, and can resist high temperatures for long periods of time.

4 Claims, 3 Drawing Figures

U.S. Patent  Mar. 1, 1977  4,009,735
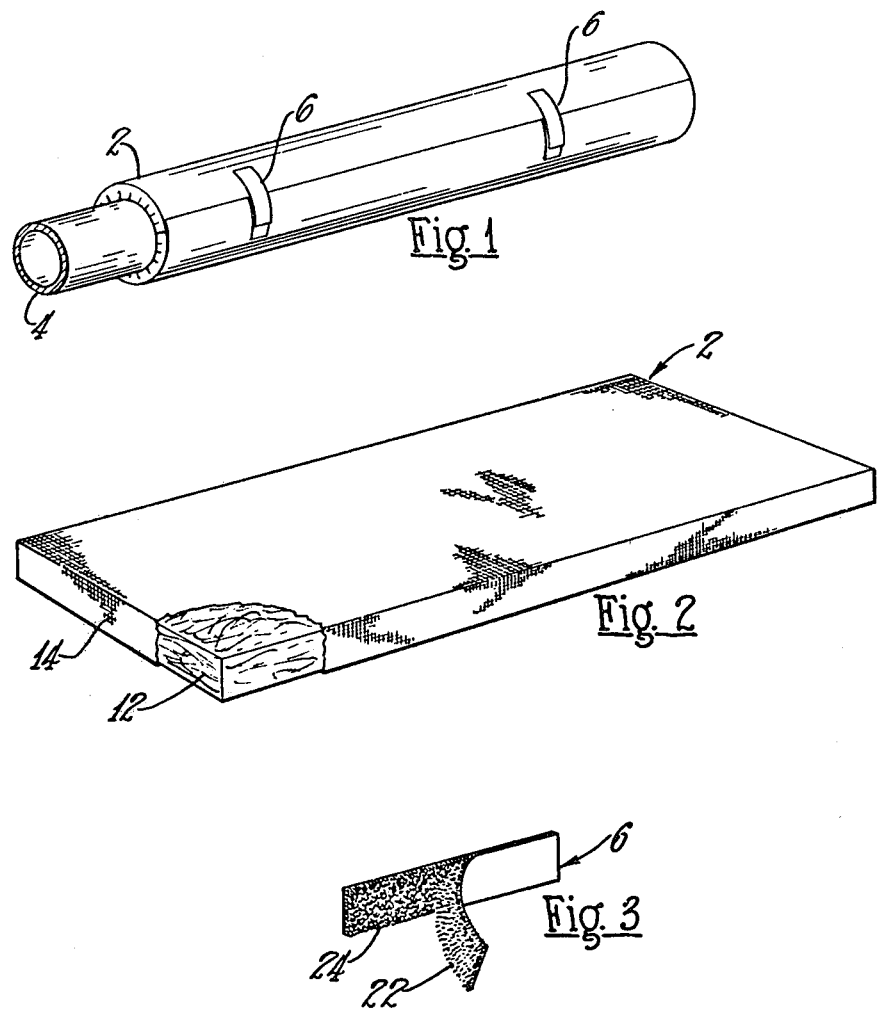

THERMAL INSULATION

This is a continuation of application Ser. No. 409,109, filed Oct. 24, 1973, now abandoned.

This invention relates to thermal insulation for vessels and piping within the reactor containment area of nuclear power plants. More specifically, this invention relates to thermal insulation for such vessels and piping, which can be readily removed and replaced from the vessels and piping for inservice inspection, can withstand repeated wettings and dryings, and can resist high temperatures for long periods of time.

Nuclear power plants utilize pressurized light water reactors, boiling light water reactors, heavy water moderated reactors and high temperature gas-cooled reactors. The thermal insulation of this invention is directed to use in light water reactors or heavy water reactors. Thermal insulation for use in nuclear power plants must take into consideration certain physical requirements. Stress corrosion cracking from contact with austenitic stainless steel is such a consideration. Other considerations are the presence of emergency spray systems in the reactor containment area and the removability of the insulation for inservice inspection of critical points. Still other basic requirements for thermal insulation within nuclear power plants include fire resistance and excellent thermal properties.

One of the more common insulations for vessels and piping within the reactor containment area of nuclear power plants is removable metal-encapsulated insulation. Usually, such insulation has a heavy gage outer metal jacket and is held in place on the vessels and piping by metal fasteners. Because of its great weight, metal-encapsulated insulation is difficult to handle, both during installation and inspection. The inner surface of this insulation is covered with a low chloride asbestos cloth. The cloth is treated with sodium silicate in inhibit chloride stress corrosion cracking.

Removable blankets of low chloride mineral fiber encapsulated in asbestos cloth also has been used for thermal insulation in nuclear power plants. Since the asbestos cloth is in contact with austenitic stainless steel, it is treated with a solution of sodium silicate to prevent chloride stress corrosion cracking. Conventional glass cloth fabric, which is considerably stronger than asbestos cloth, generally is not employed as facing for insulation for nuclear power plants since it will eventually disintegrate when treated with sodium silicate. While no exterior jacketing system is used over such blankets, the outer cloth can be coated with a Mylar film for water resistance.

Applicant now has developed readily removable, rewettable thermal insulation for vessels and piping within the reactor containment area of nuclear power plants. The readily removable, rewettable thermal insulation of this invention comprises mineral fiber or glass fiber encapsulated within a woven glass cloth. The thermal insulation of this invention is held in place on the vessels and piping with quick release fasteners. The thermal insulation of this invention can withstand repeated floodings from emergency spray systems within reactor containment areas, can withstand temperatures of 700° F for at least 40 years, based on accelerated tests, and can be readily removed and replaced for inservice inspection. While the outer surface of this insulation can be coated with a Mylar film for water resistance, such a coating is unnecessary for the use of the thermal insulation of this invention within the reactor containment area of nuclear power plants.

Accordingly, an object of this invention is to provide thermal insulation for vessels and piping within the reactor containment area of nuclear power plants.

Other objects, aspects and advantages of this invention will be apparent to one skilled in the art from the following disclosure and appended claims.

Any mineral fiber or glass fiber can be encapsulated within the thermal insulation of this invention. Generally, the fiber is a "wool"-type product which is resistant to high temperatures. The glass fibers can be corrugated, wavy, curley, or crimped. Preferably, a fine fiber is employed and the fibers are in the form of tangled or felted mats. The wool mat generally is quilted prior to covering with glass cloth.

The glass cloth of this invention is a fabric woven from yarn or strands of glass fiber. Glass fibers are produced from small streams of molten glass which exude through tiny orifices located in what is called a bushing. The tiny streams of molten glass which issue from the bushing are attenuated by pulling the fibers, during which time the streams cool and rigidify into what are called filaments. The filaments are brought together to form a strand. In another embodiment, the finishing operation can be carried out after the strands are formed. The strands are then woven into textiles. In still another embodiment, the finishing operation can be carried out after strands are woven into textiles. Preferably, the finishing operation is carried out prior to the yarn or strands being woven into a fabric.

The finish employed in this invention can vary widely. Generally, the finish is a leachable, organic silicate carried in a fatty and mineral oil vehicle. The finished fabric meets the requirements of U.S. Navy specification Mil-I-24244 with regard to chemical analysis and chemical resistance of materials used in the insulation of stainless steel, as well as the requirements of Coast Guard specification CFL-164.009 relating to incombustible materials. The glass cloth of this invention can withstand repeated wettings from spray systems within reactor containment areas of nuclear power plants and can withstand temperatures of 700° F for at least 40 years.

Any quick release fasteners can be employed in this invention. These fasteners include metal hooks, metal snaps, tape fasteners and the like. An important point here is the use of quick release fasteners that require no accessory tools to be engaged or disengaged.

Hook and loop tape fasteners made of nylon are preferred. High temperature resistant nylons generally are employed. The tape fasteners are woven and comprise two mating strips. The hook or male section is covered with stiff little hooks and the loop or female section is covered with tiny, soft loops. When pressed together the hooks and loops engage, creating a secure closure. To open, the two strips simply are peeled apart. These tape fasteners can be opened and closed many thousands of times.

Having disclosed, generally, the thermal insulation of this invention, an example now is disclosed further illustrating the thermal insulation.

FIG. 1 is a view showing a pipe wrapped with the thermal insulation of this invention.

FIG. 2 is a view in perspective of the thermal insulation laid flat with the glass fiber cloth cut away from a portion of the insulation.

FIG. 3 is a view of the quick release fastener of this invention.

Referring to the drawings, and more particularly to FIG. 1, the thermal insulation of this invention is designated 2 and is shown wrapped around pipe 4.

It is to be understood that pipe 4 can be any pipe, vessel or combination of pipes or vessels. For example, one piece of thermal insulation 2 can be employed or wrap the junction of many pipes or vessels. Naturally, the one piece of thermal insulation 2 would have to be fitted and shaped to properly insulate the junction. Thermal insulation 2 is held in place on pipe 4 with hook and loop tape fasteners 6.

The cut in FIG. 2 reveals the make-up of thermal insulation 2, which is mineral fiber or glass fiber 12 encapsulated in glass cloth 14. Generally, thermal insulation 2 is formed by placing mineral fiber or glass fiber 12 between two pieces of glass cloth which are sewn together to form glass cloth 14.

Hook and loop tape fastener 6 is shown in FIG. 3 with hook strip 22 partially peeled apart from loop strip 24.

The marked improvement of the thermal insulation of this invention, i.e., removability and rewettability, are attributed to the combination of a rewettable, high temperature resistant, asbestos replacing cloth and hook and loop tape fasteners. The thermal insulation of this invention can withstand repeated floodings from the spray systems within reactive containment areas, can withstand temperatures of 700° F for at least 40 years and can be readily removed and replaced for in-service inspection.

Modifications and variations within the scope of the attached claims are intended to be included.

I claim:

1. Readily removable and replaceable rewettable thermal insulation for use on vessels and piping within reactor containment areas of nuclear power plants comprising high temperature resistant mineral fiber or glass fiber encapsulated within rewettable, high temperature resistant, asbestos free glass cloth held in place with a plurality of spaced quick release and engage fasteners, wherein the glass cloth can withstand repeated wettings from spray systems within the reactor containment areas of nuclear power plants and wherein the fasteners are two woven nylon, hook and loop mating strips, wherein the glass cloth has a finish of a leachable, organic silicate carried in a fatty and mineral oil vehicle.

2. Thermal insulation according to claim 1 wherein the encapsulated fiber is a fine fiber and is in the form of tangled or felted mats.

3. Thermal insulation according to claim 2 wherein the mats are quilted.

4. Thermal insulation according to claim 1 wherein the strips comprise a hook strip covered with stiff little hooks and a loop strip covered with tiny, soft loops.

* * * * *

REEXAMINATION CERTIFICATE (244th)
United States Patent [19]
Pinsky

[11] B1 4,009,735
[45] Certificate Issued Sep. 11, 1984

[54] THERMAL INSULATION

[75] Inventor: Gordon P. Pinsky, Columbus, Ohio

[73] Assignee: Owens-Corning Fiberglas Corporation, Toledo, Ohio

Reexamination Request:
No. 90/000,480, Dec. 14, 1983

Reexamination Certificate for:
Patent No.: 4,009,735
Issued: Mar. 1, 1977
Appl. No.: 511,392
Filed: Oct. 2, 1974

Related U.S. Application Data

[63] Continuation of Ser. No. 409,109, Oct. 24, 1973, abandoned.

[51] Int. Cl.³ .............................................. F16L 9/14

[52] U.S. Cl. ..................... 138/147; 24/DIG. 18; 138/149; 138/DIG. 2; 428/36; 428/101; 428/268

[56] References Cited

U.S. PATENT DOCUMENTS

| | | | |
|---|---|---|---|
| 2,264,967 | 12/1941 | Cryor | 428/157 |
| 2,845,364 | 7/1958 | Waggoner | 427/224 |
| 3,012,923 | 12/1961 | Slayter | 138/DIG. 2 |
| 3,062,242 | 11/1962 | Vanderbilt | 138/DIG. 2 |
| 3,276,928 | 10/1966 | Pearson et al. | 161/DIG. 4 |
| 3,372,438 | 3/1968 | Rinecker | 24/16 R |

*Primary Examiner*—Stephan Marcus

[57] ABSTRACT

Thermal insulation for vessels and piping within the reactor containment area of nuclear power plants is disclosed. The thermal insulation of this invention can be readily removed and replaced from the vessels and piping for inservice inspection, can withstand repeated wettings and dryings, and can resist high temperatures for long periods of time.

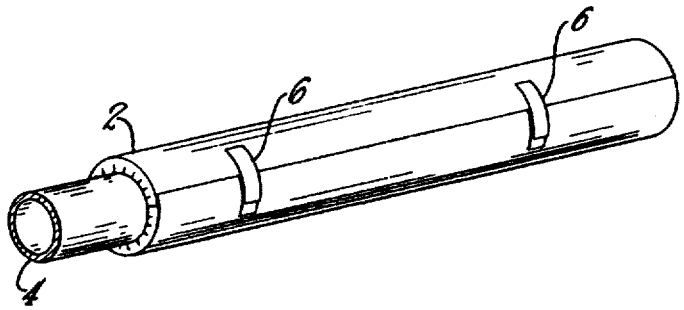

REEXAMINATION CERTIFICATE ISSUED UNDER 35 U.S.C. 307.

NO AMENDMENTS HAVE BEEN MADE TO THE PATENT

AS A RESULT OF REEXAMINATION, IT HAS BEEN DETERMINED THAT:

The patentability of claims 1-4 is confirmed.

* * * * *